United States Patent
Fossum

[11] Patent Number: 5,887,049
[45] Date of Patent: Mar. 23, 1999

[54] SELF-TRIGGERED X-RAY SENSOR

[75] Inventor: Eric R. Fossum, La Crescenta, Calif.

[73] Assignee: California Institute of Technology, Pasadena, Calif.

[21] Appl. No.: 910,452

[22] Filed: Aug. 5, 1997

Related U.S. Application Data

[60] Provisional application No. 60/030,648 Nov. 12, 1996.
[51] Int. Cl.[6] ................................... H05G 1/64
[52] U.S. Cl. ................... 378/98.8; 250/370.09
[58] Field of Search ............... 378/98.8; 250/370.09

[56] References Cited

U.S. PATENT DOCUMENTS 5,444,756   8/1995   Pai et al. ........................ 378/98.8
5,471,515  11/1995   Fossum et al. ................... 377/60

*Primary Examiner*—Craig E. Church
*Attorney, Agent, or Firm*—Fish & Richardson P.C.

[57] ABSTRACT

An imaging pixel array with event detectors for detecting input light signals and activating the imaging pixel array based on a predetermined threshold intensity of an input light. Each event detector is preferably made of auxiliary photosensitive pixels with a thresholding circuit. The imaging pixel array is activated to perform signal integration if the input light signal is above the threshold intensity. A self-triggered X-ray sensor can be realized with such event detectors. A CMOS active pixel sensor can be used as the imaging pixel array with advantages.

12 Claims, 1 Drawing Sheet

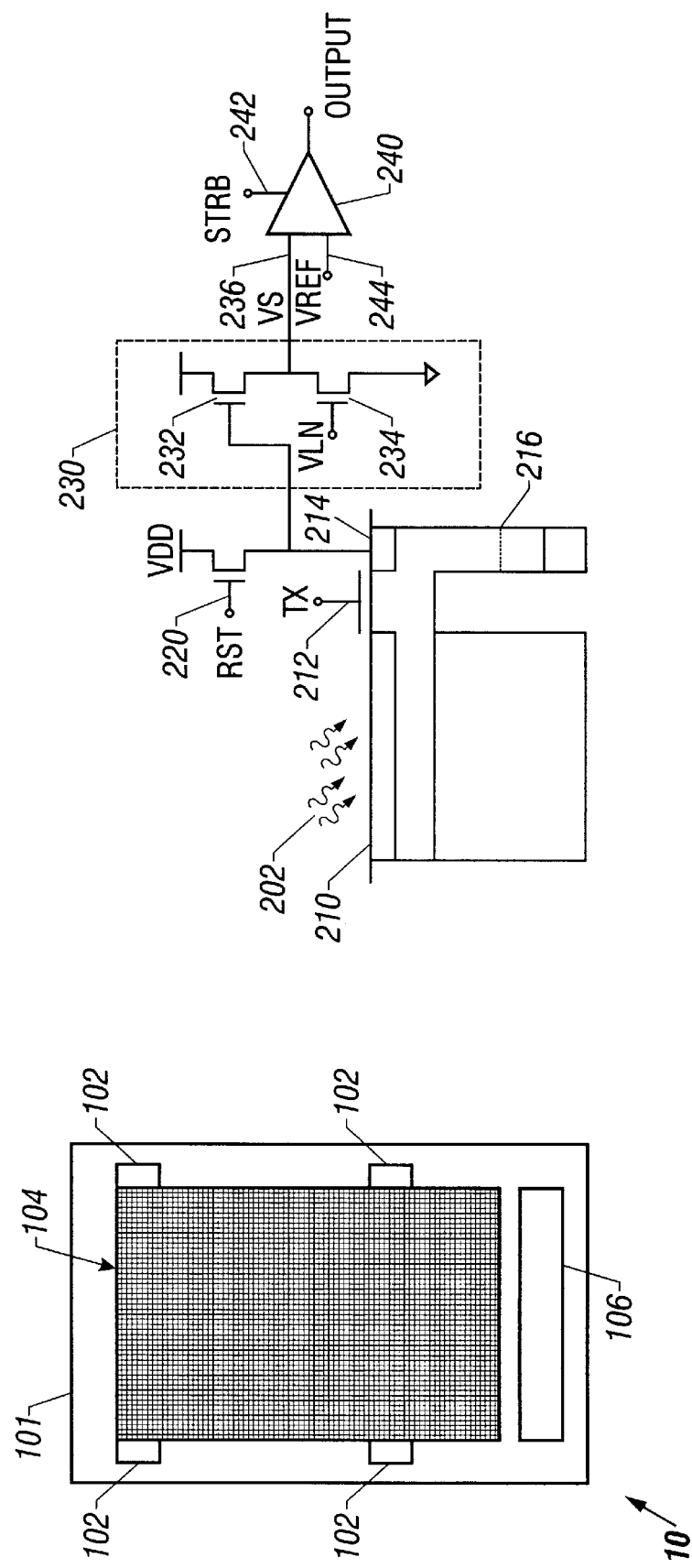

SELF-TRIGGERED X-RAY SENSOR

This application claims the benefit of the U.S. provisional application No. 60/030,648, filed on Nov. 12, 1996, which is incorporated herein by reference.

FIELD OF THE INVENTION

The present specification relates to automatically-triggered imaging systems. More particularly, the present disclosure describes a self-triggered X-ray sensor.

BACKGROUND OF THE INVENTION

Medical X-ray imaging devices usually include an X-ray source emitting X-ray radiation that passes through a patient's body part and a solid-state image sensor receiving the transmitted X-ray radiation to form an image of the body part. Many conventional X-ray imaging systems use a semiconductor charge-coupled device (CCD) as the image sensor. A layer of scintillator material is thus disposed in front of the CCD to convert the transmitted X-ray radiation into photoncarriers in a visible spectrum. Photogates in the pixel array of the CCD capture the visible photoncarriers and generate photoelectrons. A CCD signal representing a line-by-line scan of the image is produced by sequentially transferring the photoelectrons in the pixel array to a readout register.

X-ray imaging systems using CCD sensors are widely used in dental imaging applications, such as a compact device to photograph teeth. For example, U.S. Pat. Nos. 5,434,418 to Schick and 5,331,166 to Yamamoto et al. disclose this type of dental X-ray imaging devices. Both Schick and Yamamoto describe an automatic mechanism to trigger CCD readout at the end of exposure. Specifically, Schick uses a computer-aided electronic system to monitor photoinduced charges, i.e., a readout is triggered if the CCD or the photodiode array is no longer conducting. Yamamoto et al. devise an X-ray dose monitoring system to control the exposure of the X-ray. Auxiliary X-ray detectors located on the outer casing of the image sensor are used to generate a control signal to shut off the X-ray source and trigger a CCD readout if the X-ray dose reaches a predetermined dose value.

However, the triggering of the X-ray source is asynchronous with respect to the operation of the image sensor in many prior-art systems. One conventional method in operating the CCD sensor is to continuously read out the sensor. The X-ray source is triggered manually by the operator. The X-rays go through the patient's teeth and strike the sensor. When "bright" pixels are detected, a full frame of data is read out and captured. A dark reference frame, captured either during a calibration step or close in time (e.g., less than 1 second) to the illuminated frame, is subtracted from the image to produce the digital X-ray image with minimized background noise.

SUMMARY OF THE INVENTION

The inventor recognized certain limitations to a conventional X-ray imaging system, which are at least in part due to the lack of synchronous triggering.

For example, one problem is that a conventional system requires the computer to constantly scan for the presence of "bright" pixels. This can lead to the possibility of false triggering due to noise.

Lack of synchronous triggering may also introduce additional noise by integrating dark current signal when there is no photo-induced signal.

Furthermore, the image can be smeared if the CCD is clocked during the X-ray exposure since the photoinduced charge in one pixel can be mixed with that from other pixels during the charge transfer process.

The inventor realized that, a more straightforward way of initiating the readout upon triggering of the X-ray source is desirable.

The present application discloses a self-triggered imaging system to synchronize the operation of the image sensor with an input signal. In particular, the imaging system of the present invention can be used to synchronize the operation of the X-ray source and the operation of the image sensor in a X-ray imaging system, thereby providing advantages over the prior-art systems.

One aspect of the present invention is an event detector responsive to the input photons. An event detector preferably includes a photosensitive element for converting received photons into electrical signals and a thresholding circuit for comparing the photoinduced electrical signals to a preset threshold value. The pixels in the image sensor remain in a non-integrating reset state if the electrical signal in the event detector is below the threshold. The image sensor is switched into an integrating state (i.e., activated) if the electrical signal in the event detector is above the threshold. This provides an autonomous triggering mechanism for an imaging system.

Another aspect of the invention is the capability of minimizing background noise by subtracting a dark reference frame from the integrated signal. This increases the signal to noise ratio.

In a preferred embodiment, a plurality of event detectors are deployed relative to one another on the chip of the image sensor. In particular, an active pixel sensor ("APS") device can be used as the image sensor instead of the conventional CCD sensor. The event detectors are therefore made of additional photosite pixels that are located on the same chip of the APS sensor, preferably in the peripheral locations relative to the active pixel array therein.

Yet another aspect of the present invention is the use of APS as the image sensor, thus resulting in a number of advantages over the prior-art imaging systems based on CCDs. The preferred APS image sensor receives and processes input signals with the active pixels, thus eliminating the charge transfer over macroscopic distances which are inherent in CCDs. Consequently, many drawbacks associated with CCDs are avoided by using the disclosed APS sensor. For example, the readout rate of an APS is usually higher than that of CCDs. On-chip controlling and processing circuits can be integrated with active pixels with the complementary-metal-oxide-semiconductor (CMOS) process or any fabrication technique that is compatible with CMOS, e.g., NMOS. Power consumption of an APS sensor can be significantly reduced with the CMOS circuitry. Non-destructive readout can be implemented with the APS sensor. Moreover, the active pixels allow random access and the performance of APS devices can be maintained as the array size increases.

The sophistication and advantages of the present invention will become more apparent in light of the following detailed description of the preferred embodiment thereof.

BRIEF DESCRIPTION OF THE DRAWINGS

FIG. 1 shows a block diagram of an image sensor with on-chip event detection.

FIG. 2 is a schematic of the preferred event detector including a thresholding circuitry.

DESCRIPTION OF THE PREFERRED EMBODIMENT

FIG. 1 shows a preferred image sensor 100 with an event detector circuit with a plurality of event detectors 102. Preferably, all components are formed on a substrate 101. The image sensor 100 includes a pixel array 104 having photosensitive pixels arranged with respect to one another in a one or two dimensional array. CMOS active pixel sensors ("APS") are preferred for the array 104 but other pixel arrays can also be used including CCD arrays and photodiode arrays. In a typical APS device, each active pixel includes a light sensing element and one or more active transistors within the pixel itself. The active transistors amplify and buffer the signals generated by the light sensing elements in the pixels. One type of such APS devices is disclosed in U.S. Pat. No. 5,471,515 to Fossum et al., the disclosure of which is incorporated herein by reference.

The image sensor further includes on-chip logic and timing circuits 106 which control the operation of the sensor including the autonomous sequencing of the sensor 100 triggered by the event detectors 102. Extra jumpers can be implemented for adjusting the length of the delay and other sequencing parameters. These jumpers can be integrated as a part of the chip packaging and add insignificant volume and mass to the final sensor. The event detectors 102 are preferably in the peripheral locations relative to the imaging pixel array 104. Four event detectors 102 are shown in FIG. 1.

The event detectors 102 are scanned while the pixels in the imaging array 104 of the sensor 100 are in a nonintegrating reset state. When a signal is detected by any of the event detectors 102 to be above a preset threshold, an "event" is detected, i.e., there is an input light signal to the image sensor 100. In X-ray imaging systems, the presence of an event is used to indicate that the X-ray source has been triggered. The sensor chip 100 then causes all pixels in the array 104 to be placed into an integrating state, collecting photoelectrons generated by the input light signal. For an X-ray imaging system, the input light signal is the light converted from the incident X-rays by the scintillator layer. The input light converted by the scintillator layer is at a frequency to which the pixel array 104 is responsive. In some cases, this converted light is in the visible spectrum. The sensor 100 is placed into a readout mode at the end of a programmable integration period. In this mode, the pixels are sequentially read out. Optionally, at the end of this mode, the sensor 100 is placed into a second integration period and second readout to capture a dark frame. The dark frame is subtracted from the bright frame to minimize background noise.

The synchronization of the X-ray source and the operation of the image sensor by use of the event detectors obviates the aforementioned drawbacks in the prior-art X-ray imaging systems. For example, the image smearing caused by erroneous timing between the exposure of the X-ray and the CCD operation is greatly reduced. Such a smearing effect can be further minimized by using a CMOS APS pixel array as the sensor 104 rather than a CCD array since the problematic charge transfer inherent in CCDs is eliminated in APS devices. The event detectors also negative the need for constantly scanning the computer to search for "bright pixels" as in the prior-art system. Use of CMOS APS pixels is not required to practice the self-triggering system with the event detectors in accordance with the present invention. However, APS architecture is preferred in order to benefit from the advantages thereof including easy implementation of on-chip control and processing circuits and improved readout rate.

One preferred embodiment of the event detector 102 is shown in FIG. 2. Each event detector 102 has a photodiode 210, a transfer gate 212, an integrating floating diffusion node 214, a reset transistor 220, and a source follower 232 with a load transistor 234. There is also a comparator circuit 240 that generates the actual event pulse. The processing of such event detector is compatible with the widely used CMOS process.

An input light signal 202, which is generated by X-rays in a X-ray imaging system, is incident on the n+ photodiode 210. Photogenerated carriers spill over the potential formed by the transfer gate 212, typically biased at 1.25 V, to the floating n+ diffusion node 214. The potential well of the floating diffusion 214 fills. The voltage on the floating diffusion 214 is buffered by a source follower circuit 230 having transistors 232 and 234. The output voltage 236 is fed to the comparator 240. As the voltage on the node 214 drops, the buffered output voltage 236 also drops accordingly. After a specified sampling time (e.g., typically 20–50 msec), the comparator 240 is strobed by pulsing STRB 242. This activates the comparator 240. If the buffered signal 236 is less than VREF 244, a logic "0" is output, corresponding to a positive event detection. No event will result in a logic "1", that is, the buffered signal 236 is still above VREF 244. The threshold value of VREF 244 is adjusted to discriminate between dark current accumulation and the photosignal. The threshold level for VREF 244 referred back to the diffusion node 214 is indicated by level 216. After the strobe signal 242, the floating diffusion 214 is reset to a high voltage by pulsing the reset transistor RST 220.

The automatic triggering mechanism in accordance with the invention can be used to improve the accuracy of measuring the background noise (i.e., the dark reference frame). A dark reference frame is not correlated with the input photons of an image and therefore needs to be subtracted out from the final image. This dark reference frame can be obtained either in a calibration process or in a short time (e.g., less than 1 sec) prior to capturing an image. The latter is preferred since the background noise captured can more accurately reflect the actual noise level at the time of detection under the actual operating conditions (e.g., temperature and background illumination) of the sensor. The may be accomplished by sweeping in the electrons in the pixels in a pre-sampling step prior to triggering an integration state. Generally speaking, the closer the time for pre-sampling to the triggering of an integration, the more accurate the dark reference frame is. The event detection circuit of the present invention can be used to not only automatically obtain a dark reference frame prior to an integration but also allow this to be done right before the triggering of the integration. For example, the triggering mechanism can be used to terminate capturing a dark reference frame in addition to its role of initiating capture of an image. With use of APS devices, subtraction of a dark reference frame can be implemented with on-chip circuitry to speed up the processing speed and save memory space.

Although the present invention has been described in detail with reference to the preferred embodiment, one ordinarily skilled in the art to which-this invention pertains will appreciate that various modifications and enhancements may be made without departing from the spirit and scope of the following claims.

What is claimed is:

1. An imaging detection system, comprising:
   an image sensor, having a plurality of sensing pixels disposed relative to one another to form a pixel array, said sensing pixels being responsive to photons and including a charge storage structure that accumulates charge indicative of said photons, thus producing photo-electrical signals having a relation with said photons;

a control circuit, connected to said image sensor, operating to control said image sensor to operate between a reset state in which said charge is not accumulated, and an integration state in which said charge is accumulated; and an event detector, disposed relative to said pixel array and electrically connected to said control circuit, having a photosensitive element to receive a portion of said photons, said event detector operating to effect a triggering mechanism for said control circuit that controls a state of said image sensor.

2. A system as in claim 1, wherein said event detector includes a thresholding circuit connected to said photosensitive element, said thresholding circuit producing a triggering signal to said control circuit if a photosignal generated by said photosensitive element is greater than a predetermined threshold value that is set by said thresholding circuit, said triggering signal enabling said control circuit to reset said pixel array into said integration state thus generating said photo-electrical signals.

3. A system as in claim 2, wherein said image sensor, said control circuit, and said event detector are integrated relative to one another on a single semiconductor substrate.

4. A system as in claim 3, wherein said image sensor is a CMOS active pixel sensor, each active pixel of which includes a photosensitive element and signal-amplifying electronics.

5. A system as in claim 2, further comprising a plurality of additional detectors substantially identical to said event detector and electrically connected to said control circuit, said additional detectors and said event detector being positioned in proximity of said pixel array of said image sensor and working in combination to provide said triggering mechanism in said control circuit for said image sensor.

6. A X-ray imaging device, comprising:

a X-ray source, operable to emit X-ray radiation that transmits through an object to be imaged;

a scintillator material responsive to said X-ray radiation to produce photons in a signal spectrum, being disposed relative to said X-ray source and the object to receive transmitted X-ray radiation from the object and to emit said photons based on received transmitted X-ray radiation;

a photosensitive pixel array having a plurality of photosensitive pixels each with a charge storage structure that accumulates charge indicative of said photons, said pixel array responsive to said photons in said signal spectrum and disposed relative to said scintillator material in a location to receive said induced photons, operable to receive said photons from said scintillator material and produce electrical signals having a relation with said photons;

a control circuit, connected to said pixel array, operating to control said pixel array to operate between a reset state in which said charge is not accumulated, and an integration state in which said charge is accumulated; and an event circuit having a plurality of event detectors, disposed relative to said pixel array and electrically connected to said control circuit, each having a photosensitive element to receive said photons from said scintillator material, said event detectors operating to provide a triggering mechanism in said control circuit that affects said pixel array.

7. A device as in claim 6, wherein each of said event detectors comprises a thresholding circuit connected to said photosensitive element, said thresholding circuit producing a triggering signal to said control circuit if a photosignal generated by said photosensitive element is greater than a predetermined threshold value set by said thresholding circuit, said triggering signal enabling said control circuit to reset said pixel array into said integration state to generate electrical signals indicative of the object.

8. A device as in claim 7, wherein said photosensitive element is a photodiode and said thresholding circuit comprises a transfer gate connected to said photodiode, a floating diffusion node, a reset transistor connected to said diffusion node, a source follower receiving electrical signals from said diffusion node, and a comparator circuit operable to compare signals from said source follower to said threshold value, thereby producing said triggering signal for said control circuit.

9. A device as in claim 7, wherein said pixel array is an active pixel array, said control circuit operating to set all photosensitive pixels in said pixel array in a reset state if said photosignal in said event detectors is less than said threshold value and to cause all photosensitive pixels in said pixel array in an integrating state if said photosignal in said event detectors is greater than said threshold value.

10. A device as in claim 6, wherein said signal spectrum is in the visible spectral range.

11. A method for performing signal detection with a detector having a plurality of pixels, comprising:

providing a control mechanism for said pixels to control said detector to operate between a reset state in which charge sensed by said detector is not accumulated; and an integration state in which said charge is accumulated;

providing an event detection circuit for detecting presence of an incoming signal to be detected;

measuring a signal level of said incoming signal with said event detection circuit to determine whether said signal level is greater than a predetermined threshold;

maintaining said pixels in said reset state if said signal level is below said predetermined threshold; and resetting said pixels into said integration state if said signal level is greater than a predetermined threshold.

12. A method as in claim 11, further comprising:

sampling said charge prior to said resetting of said pixels from said reset state into said integration state to obtain a background signal received by said detector; and subtracting said background signal from a total integration signal obtained upon termination of said integration state.

* * * * *